United States Patent [19]
Diede

[11] Patent Number: 5,732,455
[45] Date of Patent: Mar. 31, 1998

[54] TUBING WELDING JIG

[76] Inventor: Ehrich Eugene Diede, 507 Copeland Way, Longmont, Colo. 80501

[21] Appl. No.: 567,756
[22] Filed: Dec. 5, 1995
[51] Int. Cl.⁶ ............................................. B23K 37/053
[52] U.S. Cl. ........................... 29/281.5; 269/45; 269/311
[58] Field of Search ............................ 269/45, 296, 293, 269/311; 228/49.3; 29/281.5, 290, 293, 309, 900

[56] References Cited

U.S. PATENT DOCUMENTS

| | | |
|---|---|---|
| 3,550,245 | 12/1970 | Davis .............................. 269/290 X |
| 3,827,126 | 8/1974 | Shiozawa et al. ................. 269/45 |
| 5,040,716 | 8/1991 | Stetz ............................ 269/311 X |

*Primary Examiner*—Kenneth J. Ramsey
*Attorney, Agent, or Firm*—Rick Martin

[57] ABSTRACT

A welding jig comprising a weld head support mounted on a support surface and one or more tube support pedestals having a top groove for supporting a tube in alignment within the weld head. The pedestals may be threaded to provide a height adjustment of the pedestals.

17 Claims, 3 Drawing Sheets

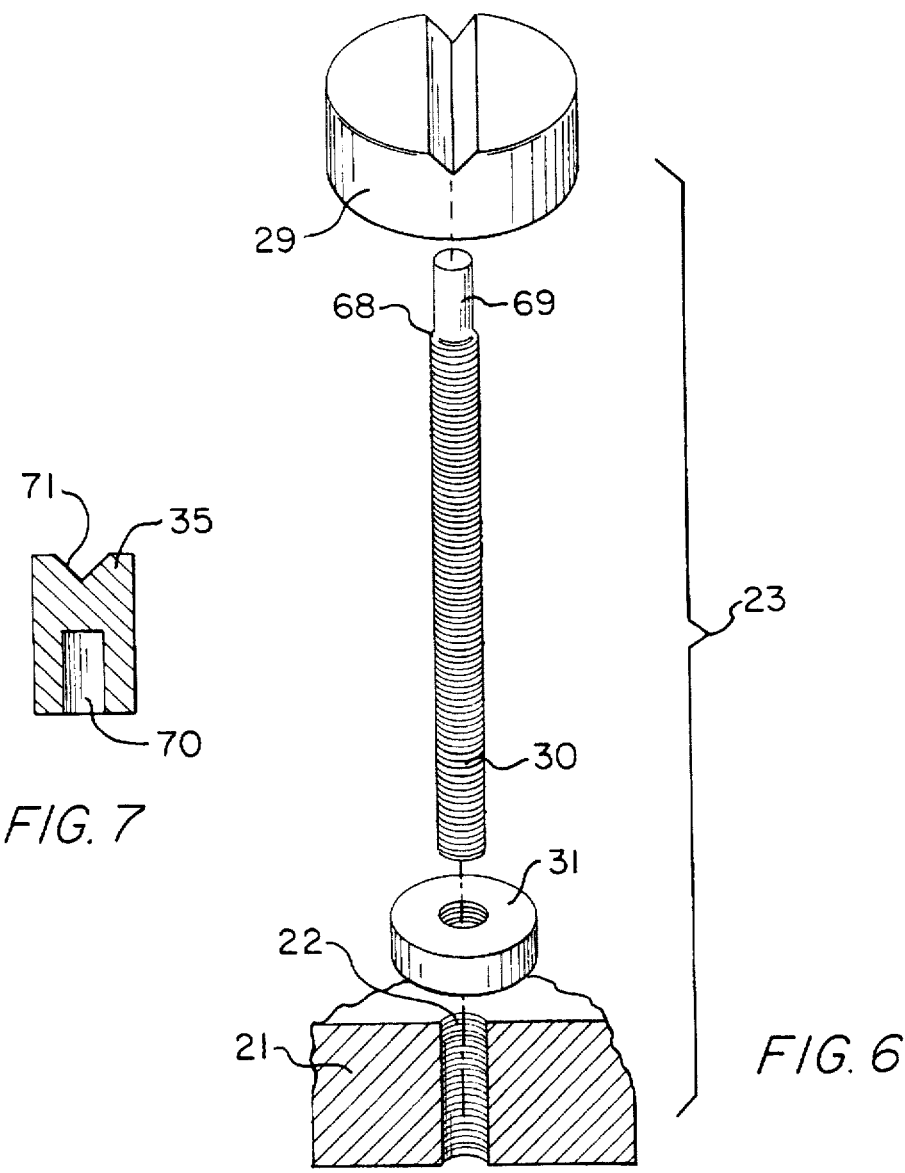
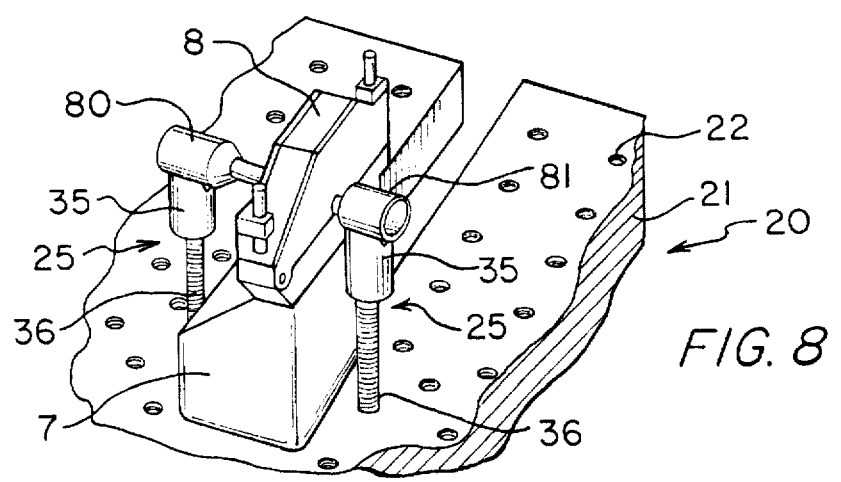

TUBING WELDING JIG

FIELD OF INVENTION

The present invention relates to providing a versatile welding jig for the welding of small diameter high-purity tubing.

BACKGROUND OF THE INVENTION

Orbital tube welders are used to weld tubing that carries ultra-high purity (U.H.P.) gases such as argon, nitrogen, and oxygen. An industry standard welder is made by Arc Machines, Inc., (AMI), Pacoima, Calif. Their orbital tube welder has a model 9-500-TCA micro fit weld head. Tubing segments having diameters of 1/8", 1/4", 3/8" and 1/2" O.D. are commonly welded together inside the weld head. However, the jaw assemblies (also called collets) of the weld head have such a small clamping surface that alignment is difficult. Therefore, it has become common practice to hold the tube segments either by hand or with clamps and blocks outside the weld head. The result of these crude methods of supporting small diameter tube segments is a high-low irregularity in the welded joint.

The present invention provides a versatile platform for supporting the weld head and the small diameter tubing segments on pedestals. Each pedestal can be precisely adjusted to the proper height to allow for a perfect weld alignment which eliminates the high-low irregularities.

SUMMARY OF THE INVENTION

The primary object of the present invention is to provide a welding jig consisting of a platform which supports a weld head and the tubing segments to be welded in a precisely aligned fashion.

Another object of the present invention is to provide for the attachment of the platform to a work bench.

Another object of the present invention is to provide pedestals having a variable height adjustment for supporting variable diameter tubing segments simultaneously.

Other objects of this invention will appear from the following description and appended claims, reference being made to the accompanying drawings forming a part of this specification wherein like reference characters designate corresponding parts in the several views.

The preferred embodiment consists of a tooled aluminum platform having approximate dimensions of 12"×13"×1". A plurality of rows of holes are drilled and tapped clear through the platform. The holes are preferably 1/4"/28. The holes allow any arrangement of pedestals to be screwed onto the platform. A weld head is mounted in the center of the platform. The user can precisely align small diameter tubing segments on the pedestals. A precision weld can be made without high-low irregularities.

BRIEF DESCRIPTION OF THE DRAWINGS

FIG. 6 is an exploded view of a pedestal which screws into the platform.

FIG. 7 is a sectional view of the pedestal top shown in FIG. 8.

FIG. 8 is a top perspective view of the preferred embodiment supporting a pair of small tubing segments.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Figure 1:
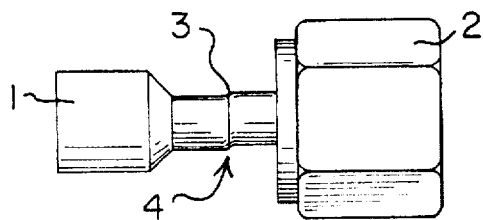
FIG. 1 (prior art) is a side plan view of a high-low irregularity weld between two reducer segments.

Referring first to FIG. 1, a tubing segment 1 has been welded to a tubing segment 2 at weld 3. Due to the small size of tubing segments 1, 2 it was necessary to hold the segments by hand in a weld head. The result is a high-low irregularity as shown by arrow 4. This high-low irregularity is not acceptable in the clean room environments which require the ultra-high purity (U.H.P.) gases carried by the tubing.

Figure 3:
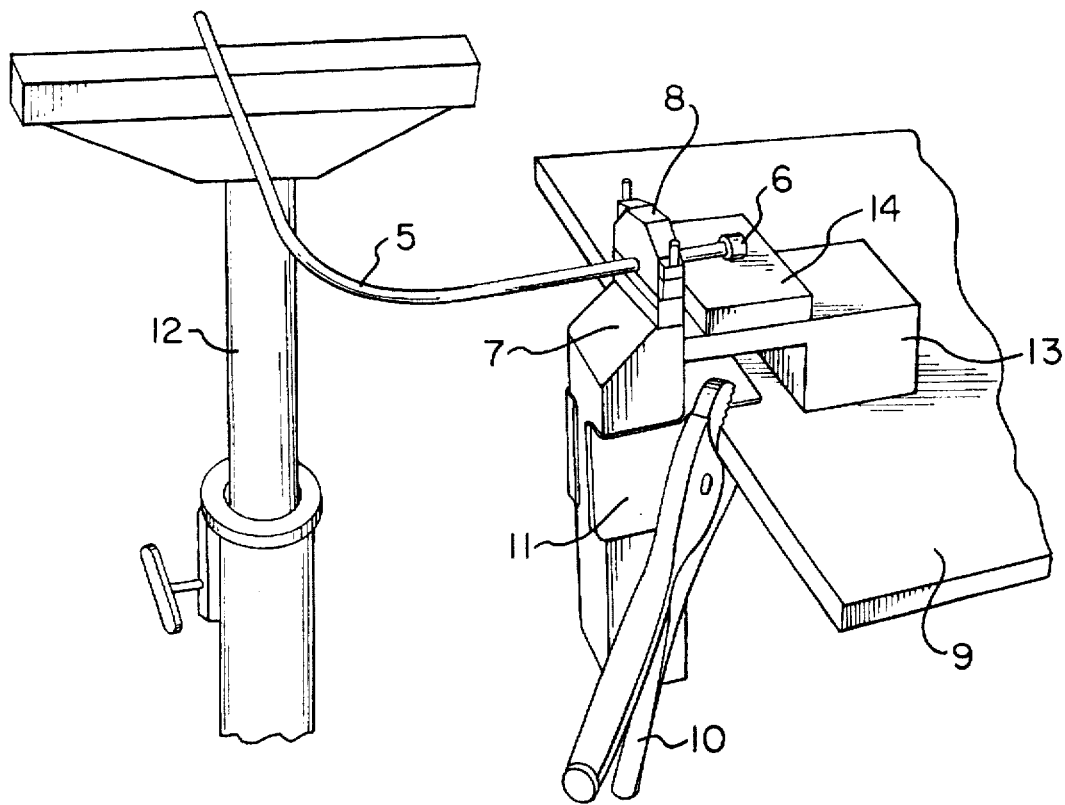
FIG. 3 (prior art) is a top perspective view of a workbench having a weld head clamped to it and a separate floor stand supporting a tubing segment.

Referring next to FIG. 3, two longer tubing segments 5, 6 are being welded by the weld head 7. The jaw assembly 8 is not capable of securing in proper alignment the smaller diameter tubing in the 1/8" to 1/2" O.D. range. The conventional method to secure the segments 5, 6 is first to clamp the weld head 7 to the table 9 using clamps 10 and clip 11. Next a floor stand 12 is used to support segment 5. Finally, blocks 13, 14 are built up to support segment 6. The resultant weld almost always has a high-low irregularity due to the inconsistent mounting means of the segments and the dependence on eyeball alignment.

Figure 4:
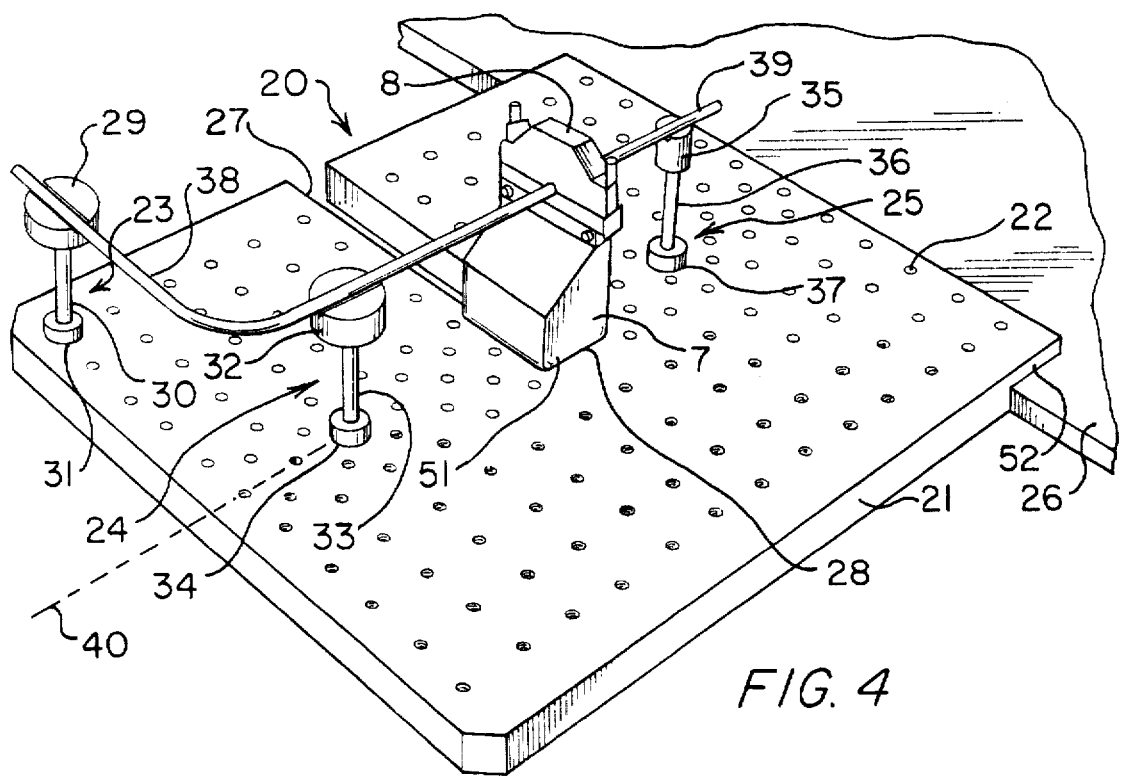
FIG. 4 is a top perspective view of the preferred embodiment supporting a pair of tubing segments inside the jaw assembly of a weld head.

Referring next to FIG. 4 the tubing welding jig 20 consists of a platform 21 clamped to a table 26. The platform 21 has a plurality of holes 22 aligned in rows. A slot 27 expands into a rectangular hole 28 which supports the weld head 7. The pedestals 23, 24, 25 support the tubing segments 38, 39 in precise alignment. The row 40 has been used to secure the pedestals 24, 25 which in turn support the segments 38, 39. The jaw assembly 8 completes the support for the segments 38, 39.

The pedestals 23, 24, 25 are comprised of three parts. The stems 30, 33, 36 are all identical. They screw into holes 22 to the desired height. The nuts 31, 34, 37 lock the stems at the desired height. The tops 29 and 32 are identical. The top 35 is smaller.

Figure 2:
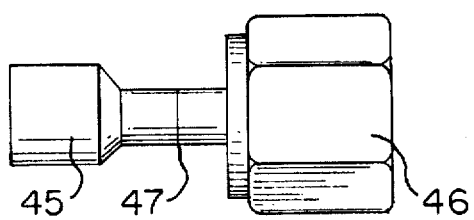
FIG. 2 is a side plan view of an identical pair of reducer segments having a precision weld and no high-low irregularity.

The welding jig 20 described above is very versatile to accommodate a wide range of shapes and sizes of tubing segments. By using the rows for segment alignment instead of eyeballing the alignment, a perfectly aligned weld 47 is readily obtainable as shown in FIG. 2 where segments 45 and 46 have been joined.

Figure 5:
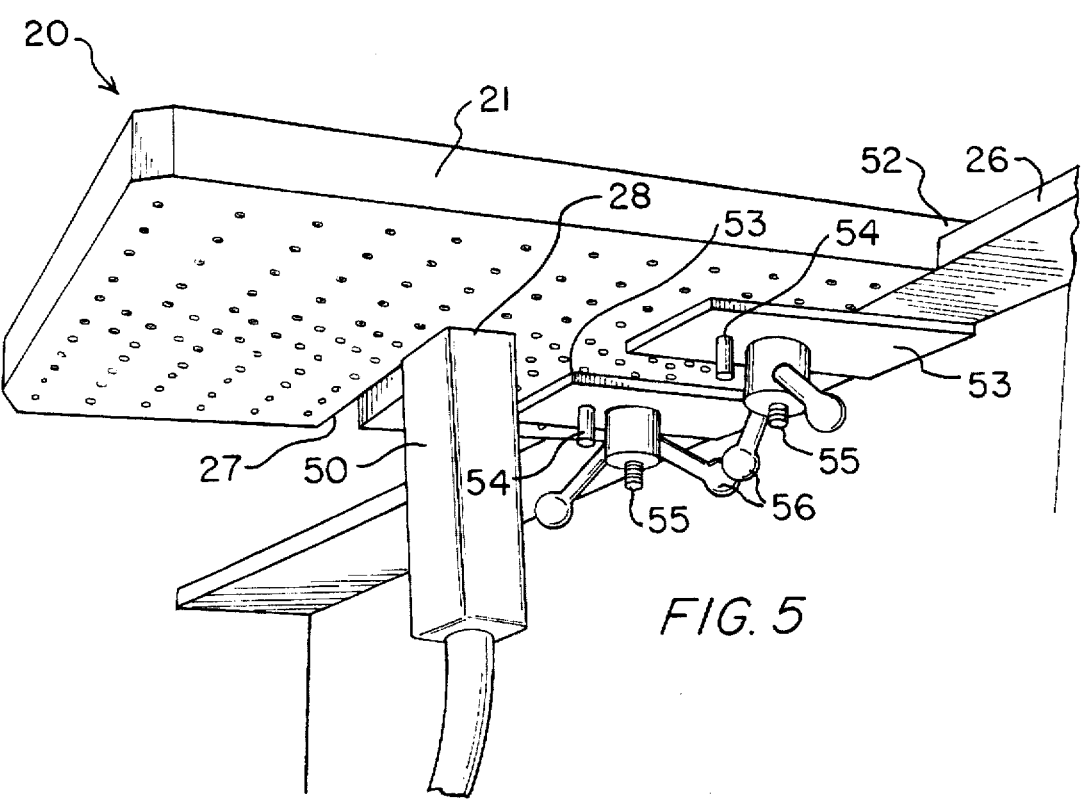
FIG. 5 is a bottom perspective view of the preferred embodiment showing the clamps to the table.

Referring next to FIG. 5 the weld head 7 is seen to be narrower at the bottom 50 than at the shoulder 51 shown in FIG. 4. This enables the bottom 50 to slide along the slot 27 before lowering the shoulder 51 into the rectangular hole 28. The platform 21 has a recess 52 which snugs against the top of table 26. A brace 53 clamps the platform 21 to the table 26. Studs 54 stabilize the braces 53. Bolt and wing nut assemblies 55, 56 are used to tighten the brace 53 into a locked position. The platform becomes an extension of the table 26. Some longer tubing segments must be supported by both the table 26 and the platform 21.

Referring next to FIGS. 6, 7 the stem 30 has threads 68 which can screw all the way through hole 22 of platform 21. The threads 68 are preferably one ten thousandth inch per revolution. The top 29 has a hole 70 that fits on tip 69 of stem 30. A groove 71 in top 29 stabilizes the tubing segments.

Referring last to FIG. 8, two small reducers 80, 81 are supported by pedestals 25. The small tops 35 are used to support the wider portion of the reducers 80, 81. The stems 36 have been precisely adjusted to the same height. The stems 36 are so close to the weld head 7 that no nuts are used. Without the tubing welding jig 20 the reducers 80, 81 would have to be held by hand.

It would be obvious to one of ordinary skill in the art to replace the holes with grooves in the platform and offer a telescoping pedestal or the like as a means for height adjustment. The pedestal could slide along the groove.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A welding jig comprising:

a platform;

a first support means functioning to hold a weld head; and a second support means functioning to hold a pedestal, whereby a tube segment is supported in proper alignment inside the weld head.

2. The welding jig of claim 1, wherein the first support means further comprises a hole in the platform.

3. The welding jig of claim 1, wherein the second support means further comprises a plurality of holes.

4. The welding jig of claim 3, wherein the plurality of holes further comprises threads which mate with a set of threads on the pedestal.

5. The welding jig of claim 4, wherein the plurality of holes are arranged in a series of rows.

6. The welding jig of claim 1, wherein the pedestal further comprises a top.

7. The welding jig of claim 6, wherein the top further comprises a flat surface having a supporting groove.

8. The welding jig of claim 1 further comprising a mounting means functioning to mount the platform to a table.

9. The welding jig of claim 8, wherein the mounting means further comprises a recess under the platform and a clamp extending under the recess.

10. In combination with a weld head having a jaw assembly, the improvement comprising:

a platform supporting the weld head;

said platform further comprising a plurality of holes aligned in rows; and a plurality of pedestals mounted in said holes, wherein said pedestals support tubing segments properly aligned inside the jaw assembly.

11. The improvement of claim 10 further comprising a recess on the platform and an opposing clamp for affixing the platform to a table.

12. The improvement of claim 10, wherein the holes further comprise threads matched to a set of threads on the pedestal and functioning to provide a height adjustment means.

13. The improvement of claim 12, wherein the pedestals each further comprise a top having a flat support surface and a groove.

14. The improvement of claim 13, wherein the pedestals each further comprise a locking nut functioning to lock the pedestal at a predetermined height.

15. A welding jig to support tubing segments in proper alignment inside a jaw assembly of a weld head, the welding jig comprising:

a platform;

a means to attach said platform to a table;

said platform having a hole to support a weld head;

said platform having a plurality of holes aligned into rows; and a plurality of pedestals threaded into said holes to provide a variable height adjustment means for each pedestal.

16. The welding jig of claim 15, wherein the means to attach said platform to a table further comprises a recess on the platform and a clamp underneath the recess.

17. The welding jig of claim 15, wherein the pedestals each further comprise a top having a flat surface and a groove.

* * * * *